(12) United States Patent
Madara (10) Patent No.: US 10,769,772 B2
(45) Date of Patent: Sep. 8, 2020

(54) METHODS FOR INSPECTING CELLULAR ARTICLES (71) Applicant: Corning Incorporated, Corning, NY (US)

(72) Inventor: Russell Wayne Madara, Corning, NY (US)

(73) Assignee: Corning Incorporated, Corning, NY (US)

( * ) Notice: Subject to any disclaimer, the term of this patent is extended or adjusted under 35 U.S.C. 154(b) by 470 days.

(21) Appl. No.: 15/575,087

(22) PCT Filed: May 17, 2016

(86) PCT No.: PCT/US2016/032832
§ 371 (c)(1),
(2) Date: Nov. 17, 2017

(87) PCT Pub. No.: WO2016/187180
PCT Pub. Date: Nov. 24, 2016

(65) Prior Publication Data
US 2020/0211177 A1 Jul. 2, 2020

Related U.S. Application Data (60) Provisional application No. 62/164,988, filed on May 21, 2015.

(51) Int. Cl.
*G06T 7/00* (2017.01)
*G06T 5/00* (2006.01)
(Continued)

(52) U.S. Cl.
CPC ..... *G06T 7/0006* (2013.01); *G01N 21/95692* (2013.01); *G06T 5/002* (2013.01);
(Continued)

(58) Field of Classification Search
CPC ..... G01N 2291/044; G01N 2291/0232; G02B 26/0858; G06K 9/4604
See application file for complete search history.

(56) References Cited

U.S. PATENT DOCUMENTS 4,319,840 A 3/1982 Kondo et al.
5,694,228 A 12/1997 Peairs et al.
(Continued)

FOREIGN PATENT DOCUMENTS

GB 1385912 A 3/1975
JP 58155343 A 9/1983
(Continued)

OTHER PUBLICATIONS

Machine Translation of JP2017560520 Office Action dated Jan. 9, 2019, Japan Patent Office, 3 Pgs.
(Continued)

*Primary Examiner* — Yosef Kassa
(74) *Attorney, Agent, or Firm* — Kurt R. Denniston (57) ABSTRACT

Methods of inspecting cellular articles such as cellular ceramic articles are disclosed, wherein the methods comprise characterizing a web structure from intensity values of a digital image. One method comprising establishing an edge location for each of the walls of the web, and an edge intensity slope SE for each edge location, and then searching for a wall intensity slope SW in one of the web walls of the characterized web structure to determine the location of a web defect. Another method involves determining at least one characteristic that defines a conforming cell, then identifying a non-conforming cell region based on the at least one characteristic, and then examining the walls within the non-conforming cell region to locate the defect in one of the walls within the non-conforming cell region.

20 Claims, 11 Drawing Sheets (51) Int. Cl.
*G06T 7/12* (2017.01)
*G01N 21/956* (2006.01)
*G06T 7/11* (2017.01)

(52) U.S. Cl.
CPC .................. *G06T 7/11* (2017.01); *G06T 7/12* (2017.01); *G06T 2207/30108* (2013.01)

(56) References Cited

U.S. PATENT DOCUMENTS

| | | | |
|---|---|---|---|
| 6,282,309 B1 | 8/2001 | Emery | |
| 6,584,218 B2 | 6/2003 | Wihl et al. | |
| 6,751,343 B1 * | 6/2004 | Ferrell | G06F 16/5838 |
| | | | 382/145 |
| 6,809,809 B2 | 10/2004 | Kinney et al. | |
| 6,820,032 B2 | 11/2004 | Wenzel et al. | |
| 6,836,560 B2 | 12/2004 | Emery | |
| 7,012,678 B2 * | 3/2006 | Enomoto | B01D 46/0086 |
| | | | 356/237.1 |
| 7,041,997 B2 * | 5/2006 | Paradis | G01N 21/8806 |
| | | | 250/559.16 |
| 7,126,681 B1 | 10/2006 | Chen et al. | |
| 7,270,101 B2 * | 9/2007 | Letourneau | F02D 9/106 |
| | | | 123/184.38 |
| 7,307,431 B2 | 12/2007 | Safai et al. | |
| 7,366,340 B1 | 4/2008 | Smithgall | |
| 7,499,156 B2 | 3/2009 | Chen et al. | |
| 7,619,222 B2 | 4/2009 | Kisilev et al. | |
| 7,614,304 B2 * | 11/2009 | Gunasekaran | B01D 46/2418 |
| | | | 73/598 |
| 7,664,310 B2 | 2/2010 | Emery | |
| 7,674,309 B2 | 3/2010 | Gargano et al. | |
| 7,679,738 B2 | 3/2010 | Nagatoshi et al. | |
| 7,849,747 B2 * | 12/2010 | Owens | B01D 46/0086 |
| | | | 73/598 |
| 8,049,878 B2 | 11/2011 | Zoeller, III | |
| 8,090,143 B2 | 1/2012 | Komaki et al. | |
| 8,134,759 B2 | 3/2012 | Albahri | |
| 8,174,689 B2 | 5/2012 | Akao et al. | |
| 8,281,661 B2 | 10/2012 | Olivier et al. | |
| 8,281,999 B2 | 10/2012 | Antognini et al. | |
| 8,285,027 B2 | 10/2012 | Zoeller, III | |
| 8,319,978 B2 | 11/2012 | Ben-Levi et al. | |
| 8,340,536 B2 | 12/2012 | Paul et al. | |
| 8,421,857 B2 | 4/2013 | Akao et al. | |
| 8,422,014 B2 | 4/2013 | Hatano et al. | |
| 8,442,299 B2 | 5/2013 | Longo et al. | |
| 8,488,181 B2 | 7/2013 | Wu et al. | |
| 8,493,558 B2 | 7/2013 | Adada et al. | |
| 8,866,067 B2 * | 10/2014 | Kohama | H01L 27/14618 |
| | | | 250/239 |
| 9,067,376 B2 | 6/2015 | Shinozuka et al. | |
| 2003/0095252 A1 | 5/2003 | Mainberger | |
| 2003/0174320 A1 | 9/2003 | Yokoyama et al. | |
| 2004/0117055 A1 | 6/2004 | Seidel et al. | |
| 2004/0223638 A1 | 11/2004 | Lespinet et al. | |
| 2005/0152616 A1 | 7/2005 | Bailey | |
| 2006/0033909 A1 | 2/2006 | Bowers et al. | |
| 2009/0141132 A1 | 6/2009 | Lehmann et al. | |
| 2009/0236542 A1 | 9/2009 | Wallis | |
| 2010/0274525 A1 | 10/2010 | Zoeller, III | |
| 2011/0122459 A1 | 5/2011 | Do et al. | |
| 2011/0128370 A1 | 6/2011 | Booth et al. | |
| 2013/0038850 A1 | 2/2013 | Feldmann et al. | |
| 2013/0212051 A1 | 8/2013 | Stephens, II et al. | |

FOREIGN PATENT DOCUMENTS

| | | |
|---|---|---|
| JP | 04013953 B | 3/1992 |
| JP | 7243974 A | 9/1995 |
| JP | 10142160 A | 5/1998 |
| JP | 2002257736 A | 9/2002 |
| JP | 2002267427 A | 9/2002 |
| JP | 2006292881 A | 10/2006 |
| JP | 2007333579 A | 12/2007 |
| JP | 2008139052 A | 6/2008 |
| JP | 2008298462 A | 12/2008 |
| JP | 2012088273 A | 5/2012 |
| JP | 2013036989 A | 2/2013 |
| TW | 200848721 A | 12/2008 |
| WO | 1999041621 A2 | 8/1999 |
| WO | 2008053512 A1 | 5/2008 |
| WO | 2011060012 A1 | 5/2011 |
| WO | 2013085385 A1 | 6/2013 |
| WO | 2013111834 A1 | 8/2013 |

OTHER PUBLICATIONS

International Search Report and Written Opinion of the International Searching Authority; PCT/US2016/032832; dated Aug. 10, 2016; 13 Pages; European Patent Office.

* cited by examiner

FIG. 9F

METHODS FOR INSPECTING CELLULAR ARTICLES

CROSS-REFERENCE TO RELATED APPLICATIONS

This application is a national stage application under 35 U.S.C. § 371 of International Patent Application Serial No. PCT/US2016/32832 filed on May 17, 2016 which claims the benefit of U.S. Provisional Patent Application No. 62/164,988 filed on May 21, 2015, the contents of both are relied upon and incorporated herein by reference in their entireties.

FIELD

The present disclosure relates to cellular articles, and in particular relates to methods of locating web defects in cellular ceramic articles, comprising identifying the type of web defects.

The entire disclosure of any publication or patent document mentioned herein is incorporated by reference.

BACKGROUND

Cellular ceramic articles are used as particulate filters and catalytic converters in cleaning exhaust streams and gas streams. The cellular ceramic articles have a web made up of finely formed walls that define a dense array of cells. The web provides a relatively large surface area for catalytic material to react with the exhaust gases that pass through the cells.

In some applications the cellular ceramic article must have sufficient mechanical and thermal integrity to withstand impact and thermal requirements. It can be advantageous to have webs without defects such as breaks in the walk or missing wall sections, sometimes referred to as "non-knitters."

SUMMARY

An aspect of the disclosure is method of inspecting a web of a cellular ceramic article, wherein the web is defined by walls each having a width and a length and that in turn define an array of cells. The method comprises: a) characterizing a web structure from a digital image of the web in terms of intensity values, comprising establishing an edge location for each of the walls of the web, and an edge intensity slope $S_E$ for each edge location; and b) searching for a wall intensity slope $S_W$ in one of the web walls of the characterized web structure to determine the location of a web defect, if present in the web, wherein the condition $\alpha \cdot |S_E| \leq |S_W|$ is satisfied, wherein a is in the range from 0.75 to 1.

Another aspect of the disclosure is a method of locating a defect in a web of an extruded cellular ceramic article, wherein the web is defined by walls each having a width and a length and that in turn define an array of cells. The method comprises: a) processing a captured digital image using a dynamic threshold process to form a processed image; b) determining at least one characteristic that defines a conforming cell; c) identifying a non-conforming cell region in the processed image based on the at least one characteristic that defines a conforming cell; and d) examining the walls within the non-conforming cell region to locate the defect in one of the walls within the non-conforming cell region.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description serve to explain principles and operation of the various embodiments. As such, the disclosure will become more fully understood from the following Detailed Description, taken in conjunction with the accompanying Figures, in which:

FIG. 8A is a plot of the gray-scale intensity I(x) (left vertical axis) and the intensity slope S (right vertical axis)

versus a normalized x coordinate for an example non-knitter defect formed in a horizontal web wall;

DETAILED DESCRIPTION

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute part of this detailed description.

Cartesian coordinates are shown in some of the Figures for the sake of reference and are not intended to be limiting as to direction or orientation.

In the discussion below, the term "cellular article" is not limited to fired ceramic material and can comprise for example an extruded ceramic greenware log and a dried ceramic greenware log.

Figure 1:
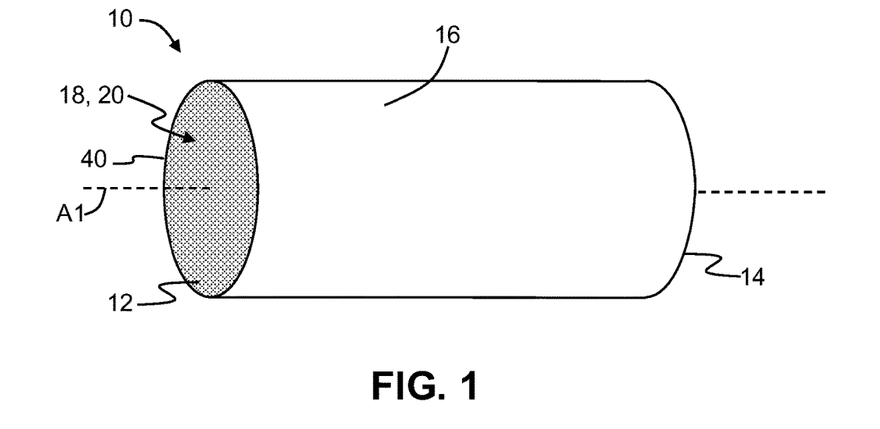
FIG. 1 is a side view of an example cellular ceramic article.
Figure 2:
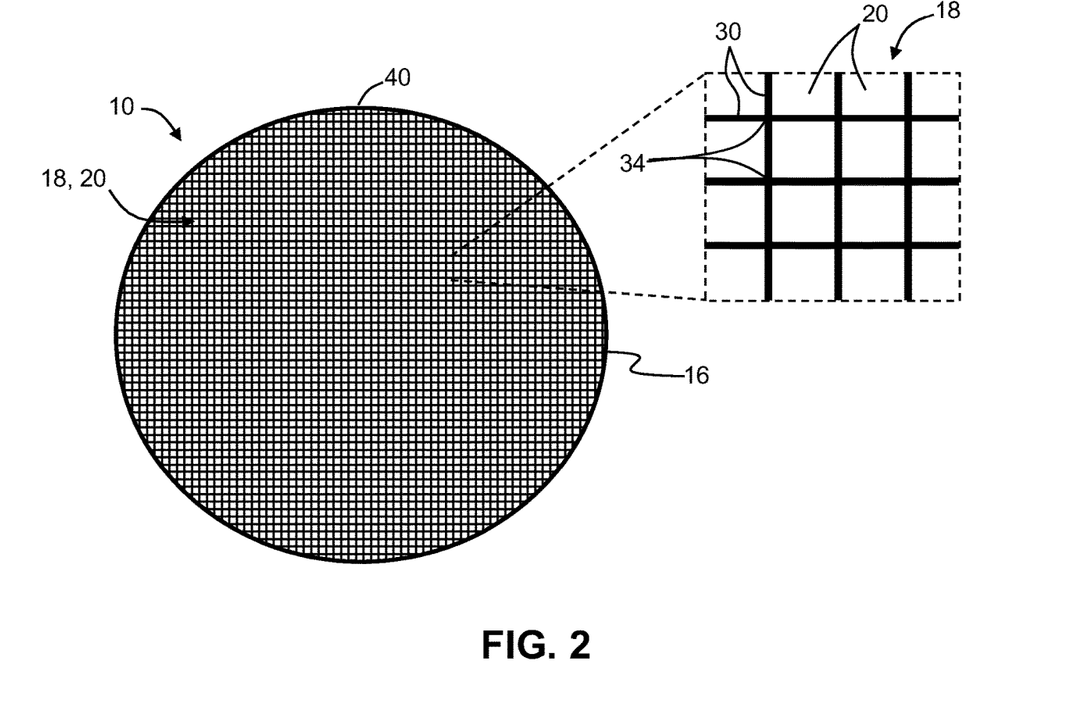
FIG. 2 is a close-up front-on view of the example cellular ceramic article of FIG. 1, and comprising a close-up in set that shows a portion of an ideally formed web.

FIG. 1 is a side view of an example cellular article 10. FIG. 2 is a close-up, front-on view of the example cellular article 10 of FIG. 1. The cellular article 10 comprises a central axis A1, a front end 12, a back end 14, and an outer surface 16. Cellular article comprises a web 18 defined by walls 30 with wall intersections 34 that define an array of cells 20. The cells 20 can have shapes other than square, such as triangular, hexagonal, etc., e.g. depending on the type of extrusion die used to form cellular article 10. An outer wall or skin 40 defines an outer shape of the cellular article 10 as well as outer surface 16. The close-up inset of FIG. 2 illustrates an example portion of perfectly formed web 18 with perfectly formed walls 30 that define perfectly formed cells 20.

Figure 3:
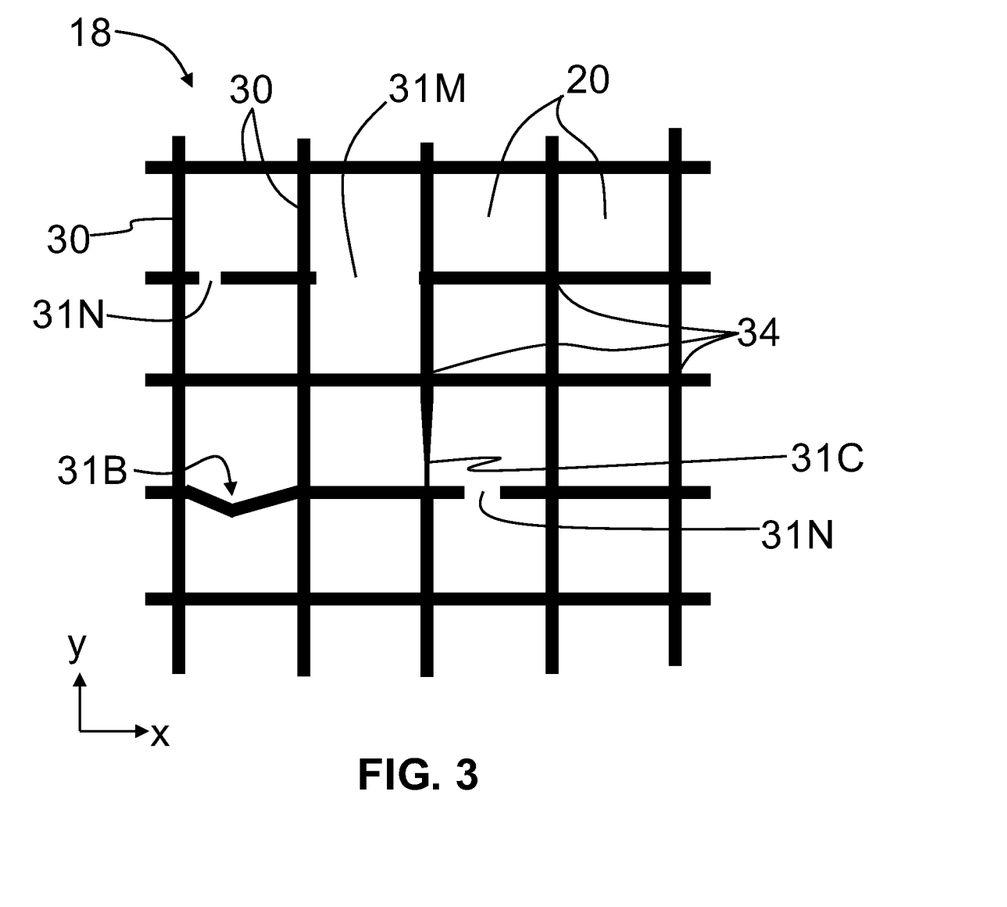
FIG. 3 is a close up view of a portion of an example web that illustrates a number of different types of web defects.

FIG. 3 is a schematic close-up front-on view of a portion of an example web 18 that illustrates a number of different types of web defects. One type of web defect is the aforementioned non-knitter 31N, which occurs when one of walls 30 in a cell 20 is not completely formed and has a gap or space therein. A non-knitter 31N is a particularly hard defect to identify because it is smaller than a single cell wall (e.g., <2 mils or <4 mils). Since many ceramic or ceramic-forming compositions are green to dark grey in color, a dark hole can be particularly hard to locate with the unaided eye. Yet, a non-knitter web defect 31N is critical to locate and identify because it can adversely impact the performance of the cellular article 10 in which it resides, e.g., it can give rise to leaks that allow particulates to pass between adjacent cells rather than being captured by the wall surfaces.

Another type of web defect is a missing wall 31M, wherein substantially the entire wall of a given cell is absent. Such a defect is somewhat easier to identify than a non-knitter because it has the dimension of a single cell 20. A missing wall 30 also adversely impacts the performance of the cellular article 10.

Another type of web defect is a bent or curved wall 31B, and such a defect does not necessarily adversely impact performance. Yet another type of web defect is a chip 31C, i.e., a small missing piece missing from a wall 30 but that does not represent an actual hole in the wall. A chip 31C differs from a non-knitter 31N in that the latter extends deep into the web while the former is relatively shallow. Like the curved wall web defect 31B, a chip web defect 31C does not necessarily adversely impact performance.

Defect Detection Method

An example method for detecting and identifying web defects in cellular article 10 comprises steps or acts: 1) capturing a web image; 2) characterizing the web structure from the captured web image; 3) identifying locations of the web defects; 4) defining regions of interest at the location of the web defects; 5) calculating web parameters for each region of interest; and 6) characterizing the type of web defects based on the web parameters.

Each of the above steps can comprise one or more sub-steps, operations, acts, etc. as described below.

Step 1—Capturing a Web Image

Figure 4A:
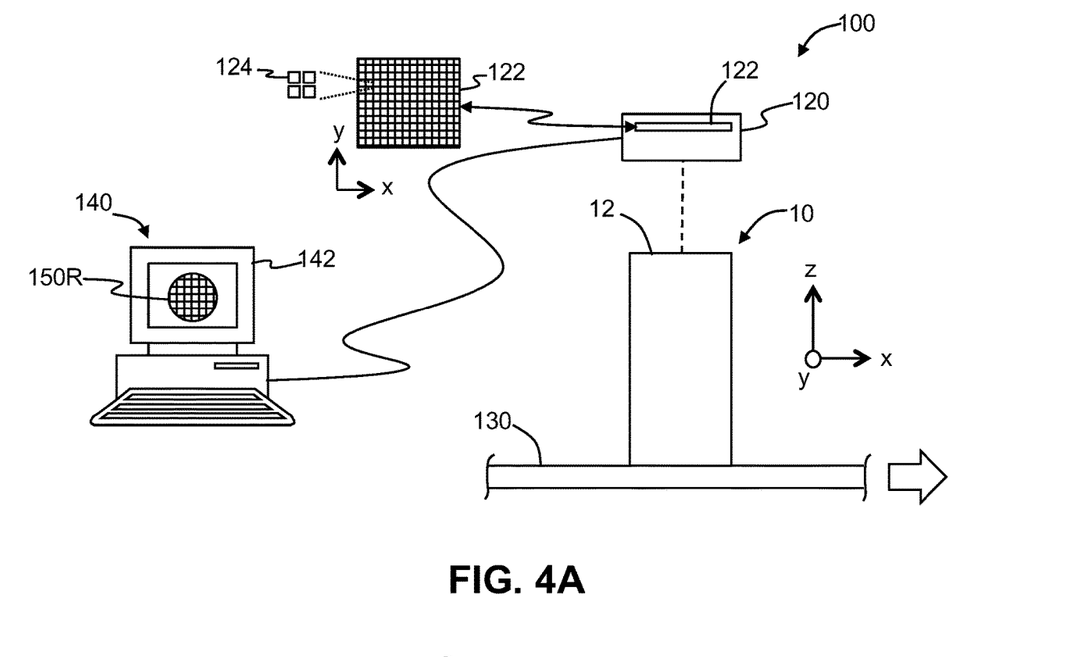
FIG. 4A is a schematic diagram of an image capture system that shows an image capture device arranged adjacent the front end of the cellular ceramic article, which resides on a conveyor.

The first step of the method involves capturing an image of the cellular article 10 and the web 18 therein. FIG. 4A is a schematic diagram that shows an example image capture system 100 that comprises image capture device 120 operably arranged adjacent the front end 12 of cellular article 10. The cellular article 10 is supported by a conveyor 130 that conveys the cellular article past the image capture device 120. The image capture device 120 comprises an image sensor 122 having pixels 124. The image capture device 120 is shown operably (e.g., electrically) connected to a computer 140 that has a display 142. The image capture device 120 is configured to capture a (raw) digital image 150R of at least a portion of web 18 at the front end 12 of the cellular article 10.

Figure 4B:
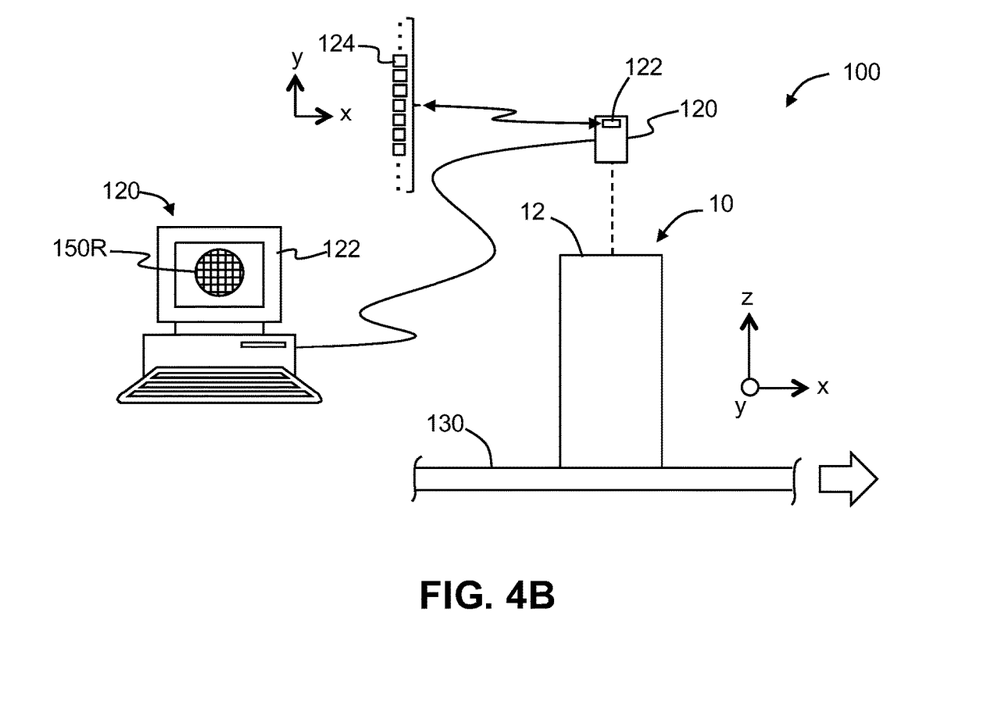
FIG. 4B is similar to FIG. 4A and illustrates an example of an image capture system wherein the image capture device comprises a linear sensor.

FIG. 4B is another example of an image capture system 100 wherein the image sensor 122 is a linear image sensor defined by a line of pixels 124 shown in the close-up inset as running in the y-direction. The linear image sensor 122 is used to capture a line image of the front end 12 of the cellular article 10 as the cellular article is conveyed past image capture device 120. In an example, the linear image sensor 122 is used as a line scanner and is arranged immediately adjacent to the front end 12 of cellular article 10 to capture a scanned digital image.

Figure 4C:
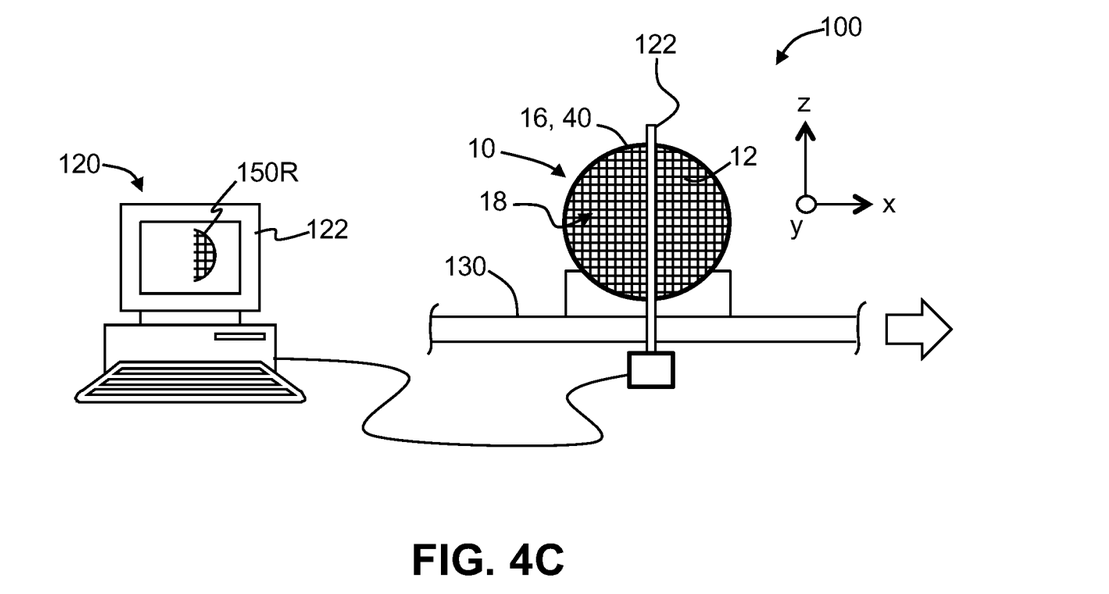
FIG. 4C illustrates an example of an image capture system wherein the image capture device is in the form of a line scanner.

FIG. 4C shows an example of image capture system 100 wherein the cellular article 10 is supported by a tray 11 so that the central axis A1 of the ceramic ware is horizontal (i.e., is in the y-direction). A linear image sensor 122 is arranged with its long axis in the z-direction and captures line images of front end 12 as conveyor 130 moves the cellular article 10 pass the linear image sensor.

Figure 4D:
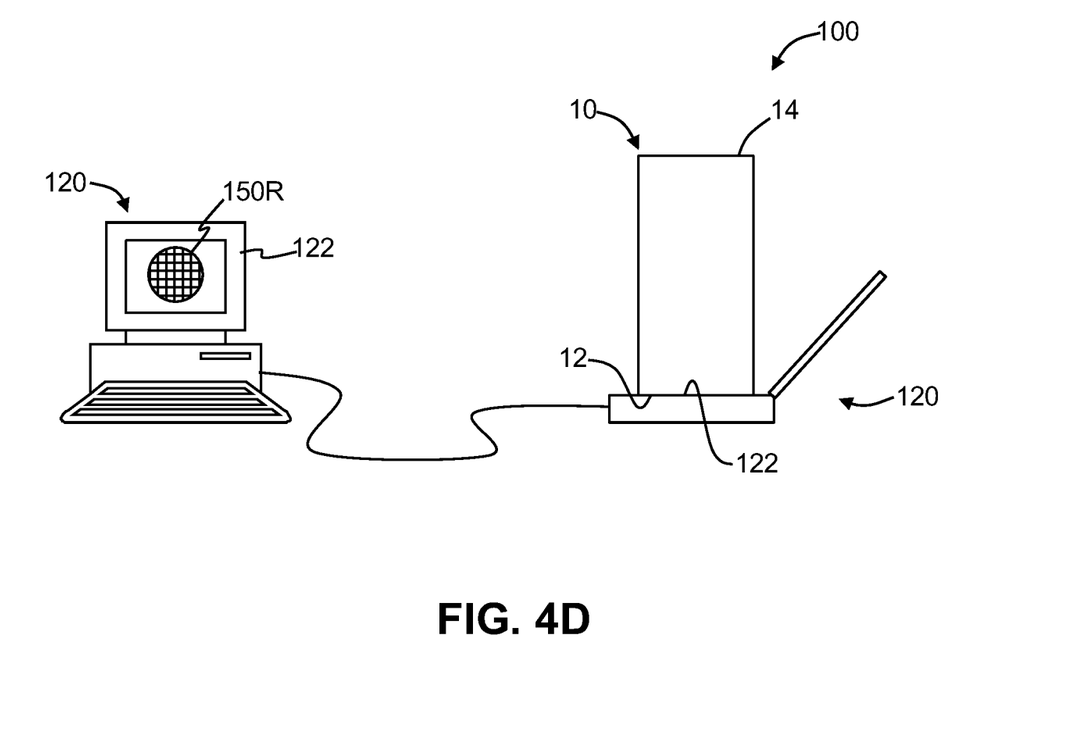
FIG. 4D illustrates an example of an image capture system wherein the image capture device is in the form of a conventional flatbed scanner.

FIG. 4D shows another example image capture system 100 wherein the image capture device 120 has the form of a conventional flatbed image scanner. The cellular article 10 can be placed directly atop the scanning sensor 122 to capture an image of front end 12 as shown. The cellular article 10 can easily be flipped over to capture of image of the back end 14 as well.

The image capture system 100 of FIG. 4D is desirable because it has a very small depth of focus, e.g., between 0.1 mm and 0.5 mm, and also have sufficient resolution, e.g., 2400 dpi. The imaging is telecentric and relatively distortion-free and aberration-free. A shallow depth of focus is desirable because it can allow for distinguishing between defects that extend deep into the web (e.g., non-knitters 31N, which may require adjustment of an extrusion process for example, and defects that are superficial (e.g., chips 31C) and may not, for example, require adjustment of an extrusion process.

In an example, computer 140 is used to stitch together line-scan images of web 18 to form the larger 2D raw captured image 150R when a line scanner 122 is used. In an example, the raw captured image 150R comprises the entire front end 12 of cellular article 10 so that it comprises the entire web 18. FIGS. 4A and 4B show the raw captured image 150R being displayed on display 142 of computer 140. Capturing an image of one end (e.g., front end 12) of the cellular article 10 can be sufficient to perform the method disclosed herein, for example if the cellular article is formed by extrusion then any extrusion-related defects may be substantially consistent along the axial dimension of the cellular article.

The captured raw image 150R has associated therewith a first resolution defined by the relationship between the pixel size and the size of the captured image. In an example, image capture device 120 is configured such that each pixel 124 of image sensor 122 represents a 5 micron×5 micron region of web 18. Different optical resolutions can be used to change this pixel-to-region relationship. The optical resolution can be selected depending on the characteristics of the cellular articles 10 being measured, e.g., different cell densities. One preferred range of diameters of cellular articles 10 is from 4 inches to 14 inches. Various cross-sectional shapes can also be accommodated, e.g., round or oval, rectangular, asymmetrical. The captured raw image 150R at 5 microns per pixel level can thus range in size, for example, from 20,000×20,000 pixels for a 4 inch part to 70,000×70,000 pixels for a 14 inch part.

In an example, an image processing step can be carried out that smoothes out the raw captured image 150R, e.g., to remove noise. This can be done using known image-processing techniques, e.g., using a smoothing kernel. In this aspect of the method, the following web characterization step can be performed based on the processed captured image rather than the raw captured image.

Step 2—Characterizing the Web Structure

Once a digital image of web 18 is captured, the next step is to characterize the web structure from the captured digital image using intensity values. Each pixel of the captured digital image 150R has an associated intensity value, which can be a gray scale value from 0 to 255. As noted above, web 18 is defined by walls 30 that in turn define cells 20. So the web structure can be characterized by determining select features of the cells 20, and in particular walls 30 that define the cells.

In an example, the select features comprise the cell center-of-mass or centroid C, the intersection locations IL of the web intersections 34, and the shape (thickness) web walls 30. To find the location of any web defects that may be present, walls 30 of web 18 may be characterized using the intensity values in the captured digital image 150R and then web defects may be spotted as signatures in the wall intensity values.

In an example, web 18 is characterized by first establishing a basic intensity threshold $I_{TH}$ for the intensity captured image of the web. In an example, the basic intensity threshold is defined as ½ of the peak intensity $I_p$ in any given linear row of gray-scale values, wherein the row starts at the centroid of each cell and extends to the adjacent cell's centroid.

Figure 5A:
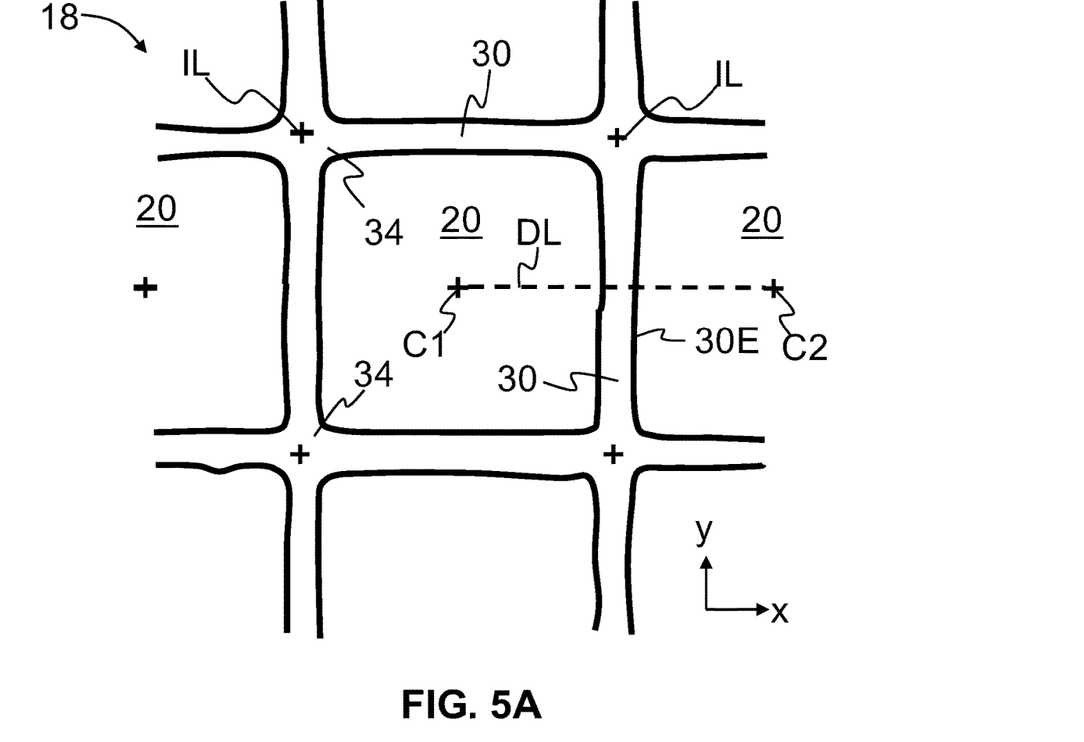
FIG. 5A is a close-up, front-on view of an example portion of a web showing the centroids of adjacent cells, as well as web intersection locations associated with the central cell.
Figure 5B:
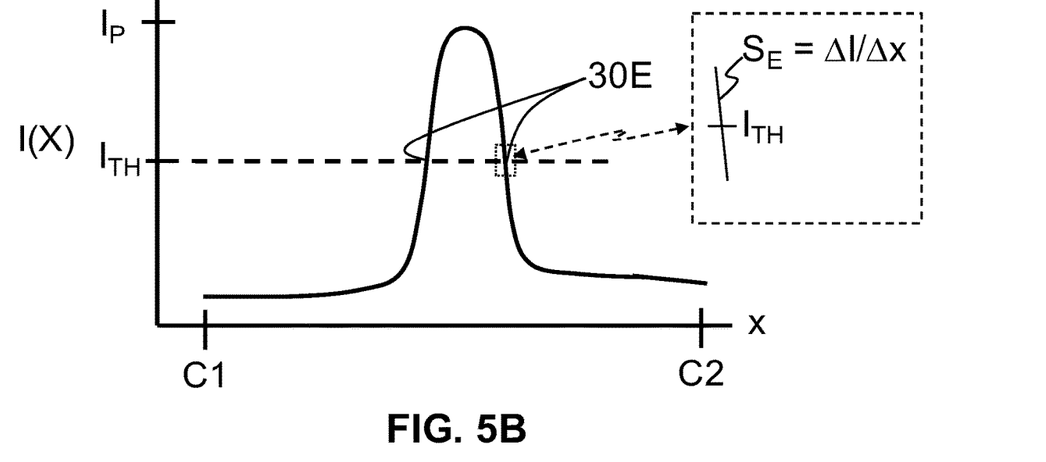
FIG. 5B is a schematic plot of the intensity I(x) in the captured image versus the distance x between the centroids of adjacent cells in FIG. 5A as taken along the dotted line and showing the peak intensity $I_P$ and the basic intensity threshold $I_{TH} = \frac{1}{2} \cdot I_P$ that defines an edge location and corresponding edge intensity slope $S_E$.

FIG. 5A is a close-up, front-on view of an example portion of web 18 showing centroids C1 and C2 of adjacent cells 20, as well as wall intersection locations IL. FIG. 5B is a schematic plot of the intensity I(x) versus the distance x between the centroids C1 and C2 taken along the dotted line DL and showing the peak intensity $I_p$ and the basic intensity threshold $I_{TH}=½·I_p$.

Once the basic intensity threshold $I_{TH}$ is established, it is used to define a wall edge 30E and the edge intensity slope $S_E$ at the wall edge for each cell 20. By defining the wall edges 30E, the web structure can be characterized. The close-up inset in FIG. 5B shows the edge intensity slope $S_E$ of the intensity curve at wall edge 30E, which is defined at the intensity threshold $I_{TH}=½·I_p$. The edge intensity slope $S_E$ is the rate of change of intensity I versus position x (or y), e.g., $S_E=\Delta I/\Delta x$, and is expected to be relatively steep at the wall edge 30E since this location represents the transition from the "dark" cells 20 to the "bright" walls 30.

The magnitude $|S_E|$ of the edge intensity slope $S_E$ (or the magnitude of average edge intensity slope $|<S_E>|$) at the wall edge 30E can later be compared to the magnitude $|S_W|$ of the wall intensity slope $S_W$ measured along the length of the wall to identify web defects in the form of non-knitters, because a non-knitter defect 31N should generate a wall intensity slope $S_W$ having substantially the same magnitude as that formed by a wall edge 30E, e.g., in some embodiments to within 20% or in other embodiments to within 10% or in other embodiments to within 5%.

Step 3—Identify Locations of the Web Defects

Next, the locations of web defects are identified in the characterized web 18 by searching the characterized web for dark spots that manifest as relatively large values of the magnitude of the wall slope $|S_W|$ along the length of a given web wall 30. The dark spots are potentially non-knitter defects 31N or chip defects 31C, and at this point there is insufficient information to determine the difference with a high degree of accuracy.

As discussed above, in an example, the web defect that shows up as a dark spot satisfies the condition of the magnitude of the wall intensity slope $|S_W|$ being substantially the same as the magnitude of the edge intensity slope $|S_E|$. In an example, this condition can be expressed as $\alpha·|S_E|\leq|S_W|$, wherein $\alpha$ is in the range from 0.75 to 1.

Figure 6A:
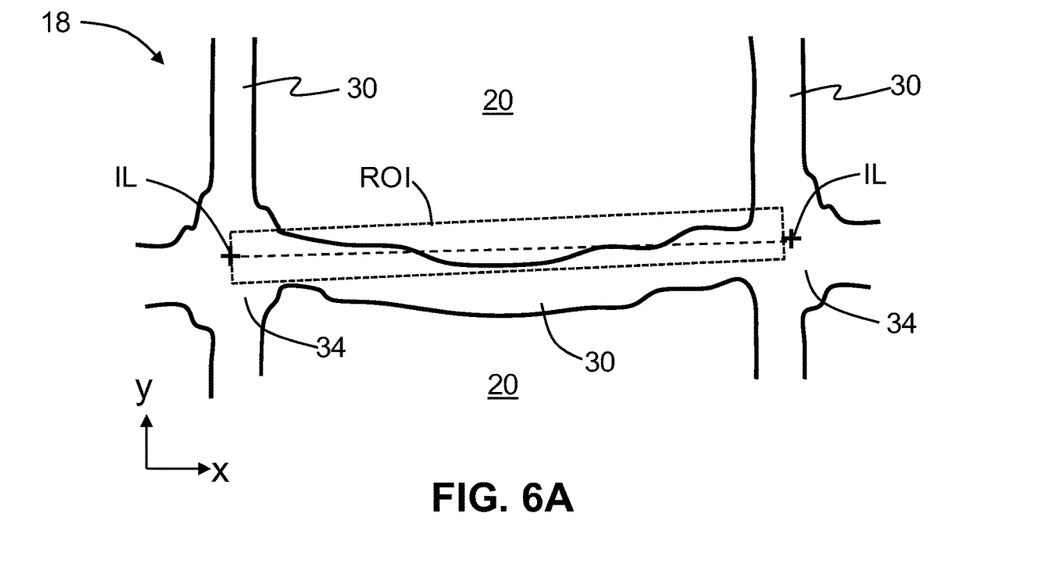
FIG. 6A is a close-up view of a portion of an example web showing a curved wall and how a measurement of intensity taken over a line that connects adjacent web intersection locations can pass over a dark space that is actually part of a cell rather than a non-knitter in the web wall.

The process of identifying the location of web defects can be complicated by the fact that some walls 30 can be curved. Searching straight across a curved wall between adjacent intersection locations IL could incorrectly identify a large dark area of a portion of a cell 20 as a location of a non-knitter defect 31N. This situation is illustrated in FIG. 6A.

Figure 6B:
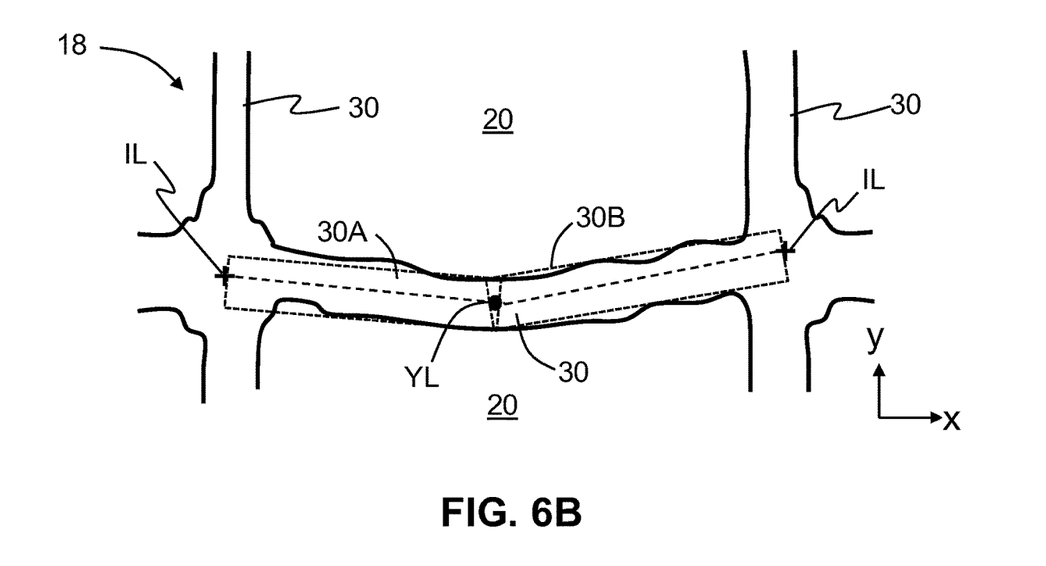
FIG. 6B is similar to FIG. 6A and illustrates an example of how a curved wall can be approximated by two angled linear wall segments to avoid a mischaracterization of a web defect.

To account for the possibility of curved walls, a line is extended between the adjacent intersection locations 34. An interpolation is then performed to determine a Y location YL of the middle of the web wall 30. If the Y location YL is offset from the straight line connection between adjacent web intersections 34 by more than a certain amount (e.g., greater than half the web width), then the wall 30 is considered to be "curved." In this case, the curved wall is approximated as being formed by two wall sections 30A and 30B, as shown in FIG. 6B. The search for the location of a web defect is then conducted in the two wall sections 30A and 30B. This avoids inadvertently identifying a curved wall 30 as a non-knitter defect 31N.

Step 4—Defining Regions of Interest (ROIs)

Once one or more web defects are located, the next step is using the location of the web defects to define corresponding regions of interest (ROIs) on respective walls 30 that comprise one of the web defects.

Figure 7:
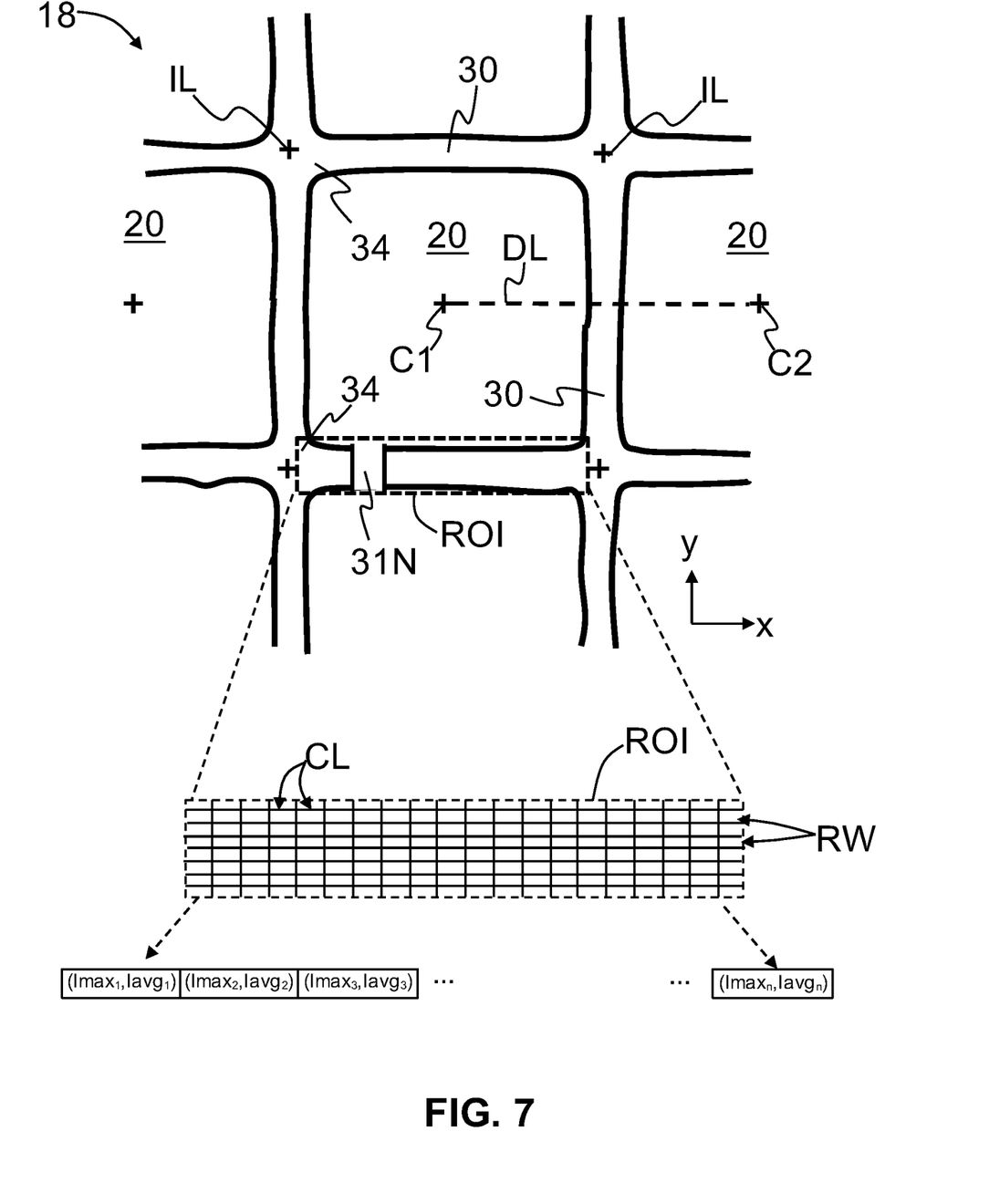
FIG. 7 is similar to FIG. 5 and shows the lower horizontal wall of center cell as having a non-knitter web defect, and also showing a region of interest comprising rows and columns of intensity values, and schematically illustrating how the columns are used to calculate maximum intensity values $max_1, max_2, \ldots max_n$ and an average intensity value $avg_1, avg_2, \ldots avg_n$ for the region of interest.

FIG. 7 is similar to FIG. 5A and shows a region of interest ROI formed on a wall 30 that comprises what at this point is known to be located a web defect but not necessarily a non-knitter 31N. An example region of interest ROI has width equal to the nominal or average wall width of the characterized web, while the length L is the nominal or average distance between intersection locations IL of the characterized web. Note that in FIG. 6B, two regions of interest ROI that correspond to wall sections 30A and 30B would be employed. The region of interest is configured so that it covers substantially the entire wall 30 that contains the web defect to be evaluated.

Each region of interest ROI represents a matrix of pixels each with a gray-scale intensity value. The intensity values can be represented by locations in rows RW and columns CL in the matrix.

Step 5—Calculating the Web Parameters

In the next step, a number of web parameters are calculated that allow for determining the type of web defects present. The web parameters are calculated using a number of steps that are now described.

Within each region of interest ROI, for each column CL the intensity values are examined down the rows and the maximum intensity value $Imax_n$ within each column is determined. The average intensity value $Iavg_n$ of each column CL is also determined. The maximum intensity values $Imax_n$ for each region of interest ROI are then stored, e.g., in an array variable MAX, which can be considered as a single row of representative intensity values for region of interest ROI. The average (gray scale) intensity values $Iavg_n$ are also stored, e.g., in an array AVG.

The method then finds the minimum MIN $\{Imax_n\}$ of these maximum intensity values $Imax_n$ and stores the value, e.g., in a variable MIN.

The method then comprises: 1) deriving from MIN the average of the values for MIN $\{Imax_n\}$, which is denoted <MIN $\{Imax_n\}$>; 2) deriving from AVG an overall average intensity <AVG> of gray scale values by the calculation <AVG>=$((\Sigma Avg_N)/N)$ in the web; and 3) deriving from <AVG> a standard deviation $\sigma_{GS}$ of the gray scale intensity values.

Step 5—Characterizing the Web Defect Using the Web Parameters

The web defect in a given region of interest ROI can be characterized using the maximum intensity values $Imax_n$.

In an example, the method uses the maximum intensity values $Imax_n$ values to find a maximum number of consecutive points (i.e., adjacent locations) in the region of interest where the values of $Imax_n$ go below a given threshold intensity value. The given threshold intensity value can be equal to or based on the values for <MIN $\{Imax_n\}$>, <AVG> or $\sigma_{GS}$, or can be based on a combination of these values. The resultant value of this threshold-based calculation of the maximum number of consecutive points is sorted in a local variable "counts below threshold" CBT.

The method also comprises calculating the 1st derivative of the MAX values (with respect to position, e.g., x or y) and the maximum value of this 1st derivative for the given region of interest is stored in the variable dMax, while the minimum of the $1^{st}$ derivative is stored in the variable dMin. The distance between the location of the maximum derivative dMax and the location of minimum derivative dMin can be measured as a number of image pixels NP. Note that dMax represents the greatest or maximum slope of the maximum intensity values $Imax_n$ while dMin represents the least or minimum slope of the maximum intensity values $Imax_n$. So dMax and dMin are select values of the aforementioned wall intensity slope S of the $Imax_n$ values.

The distance between dMax and dMin as represented by the number NP of intervening image pixels indicates how fast the maximum intensity $Imax_n$ transitions from a location of rapid change usually associated with a wall edge to a location of small change usually associated with a solid portion of the wall. However, the rapid changes in intensity are not due to wall edge 30E but are due to at least one web defect. This is because the region of interest ROI does not comprise a transition over the wall edge but instead looks at intensity values taken along the length of the wall. In fact, the intensity values are compressed in the "width" direction of a given wall 30 by processing the columns CL as described above to obtain the maximum intensity values $Imax_n$ and the average intensity values $Iavg_n$.

At this point, there is sufficient information to differentiate with good accuracy between a good web wall, a non-knitter defect 31N and a chip defect 31C for each region of interest ROI considered. To this end, example limits or thresholds are applied to one or more of the calculated values CBT, dMax, dMin and NP. As discussed above, the example limits or thresholds for these values, which are respectively denoted as $TH_{CBT}$, $TH_{Max}$, $TH_{Min}$, and $TH_{NP}$, can be equal to or otherwise based on the values for <MIN $\{Imax_n\}$>, <AVG> or $\sigma_{GS}$, or a combination of these values.

For a "good web," i.e., a wall 30 in the region of interest ROI that has no substantial web defect, in one example the condition CBT=$TH_{CBT}$=0 is satisfied, while in another example the condition CBT $TH_{CBT}$ is satisfied, where $TH_{CBT}$ is a small number such as 2 or 3.

For a non-knitter web defect 31N, in an example the conditions CBT>0, and dMax>$TH_{Max}$ and dMin<$TH_{Min}$, and NP>$TH_{NP}$ are satisfied, wherein $TH_{Max}$ can be in the range from 35 to 50 (with an exemplary value being 40), $TH_{Min}$ can be in the range from −35 to −50 (with an exemplary value being −40), and $TH_{NP}$ can be in the range from 1 to 3 (with an exemplary value being 2).

For a chip web defect 31C, in an example the conditions CBT>0, and dMax>$TH_{Max}$ and dMin<$TH_{Min}$, and NP>$TH_{NP}$ are satisfied, wherein $TH_{Max}$ can be in the range from 20 to 30 (with an exemplary value being 25), $TH_{Min}$ can be in the range from −20 to −30 (with an exemplary value being −25), and $TH_{NP}$ can be in the range from 1 to 3 (with an exemplary value being 2).

Figure 8A:
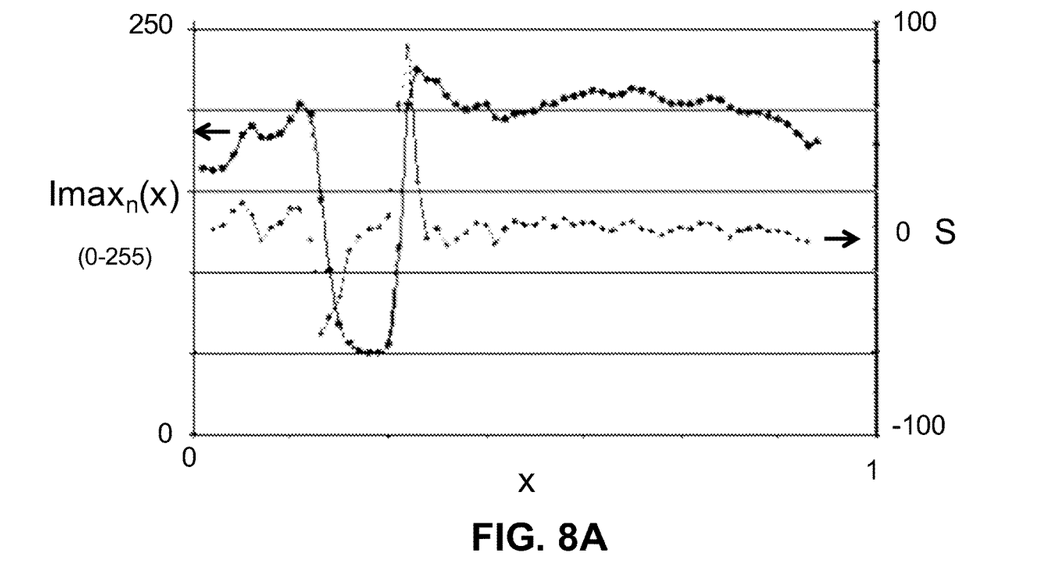

FIG. 8A is a plot of the gray-scale intensity $Imax_n(x)$ (left vertical axis) and the intensity slope S (right vertical axis) versus a normalized x coordinate for an example non-knitter defect 31N such as shown in FIG. 7 or FIG. 3. The relatively dramatic change in intensity $Imax_n$ and relatively sharp variation in the intensity slope S are signatures of a non-knitter defect 31N and are identifiable by the above-described criteria for CBT, dMax and dMin.

Figure 8B:
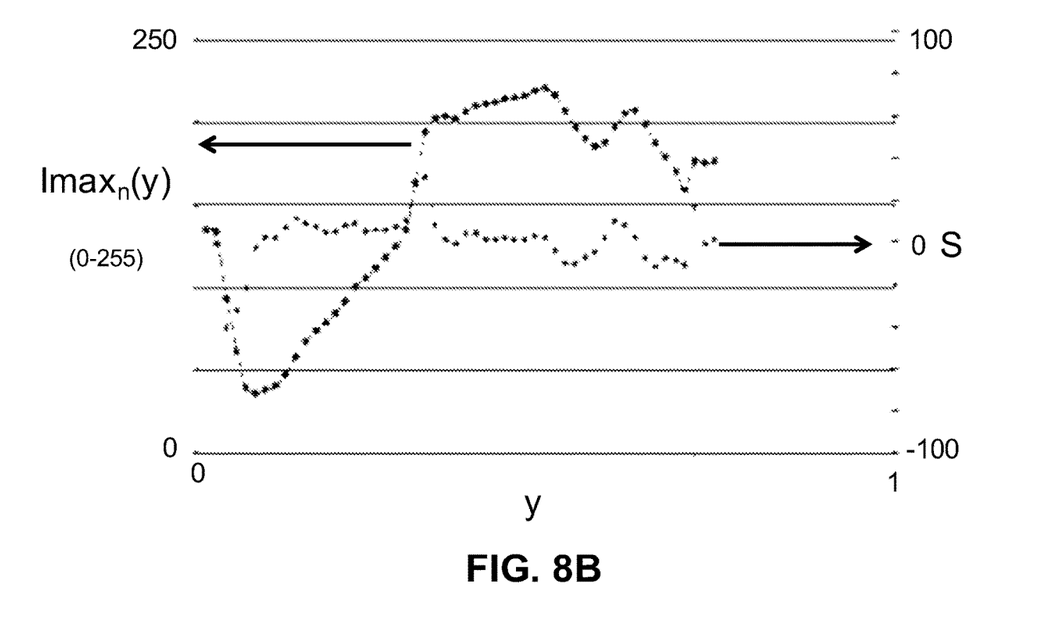
FIG. 8B is a plot of the gray-scale intensity I(y) (left vertical axis) and the intensity slope S (right vertical axis) versus a normalized y coordinate for an example chip defect formed in a vertical web wall.

FIG. 8B is similar to FIG. 8A, but for a normalized y-coordinate, for an example chip defect 31C, such as shown in FIG. 3 in one of the vertical walls 30 in web 18. Note that the change in intensity $Imax_n(y)$ is not as sharp as for a non-knitter defect 31N. Likewise, the intensity slope does not comprise large variations as a function of distance y as compared to the non-knitter defect 31N. The above-described criteria for CBT, dMax and dMin can be applied to the data of FIG. 8B to confirm that the web defect is a chip defect 31C.

Alternative Method

An alternative embodiment method of characterizing the web defects has the following steps or acts: 1) capturing an image of the web; 2) forming a processed image using a dynamic threshold process; 3) identify non-conforming cell regions; and 4) reconstructing the web wall of interest in the non-conforming cell region to identify the web defects in the web wall.

Figure 9A:
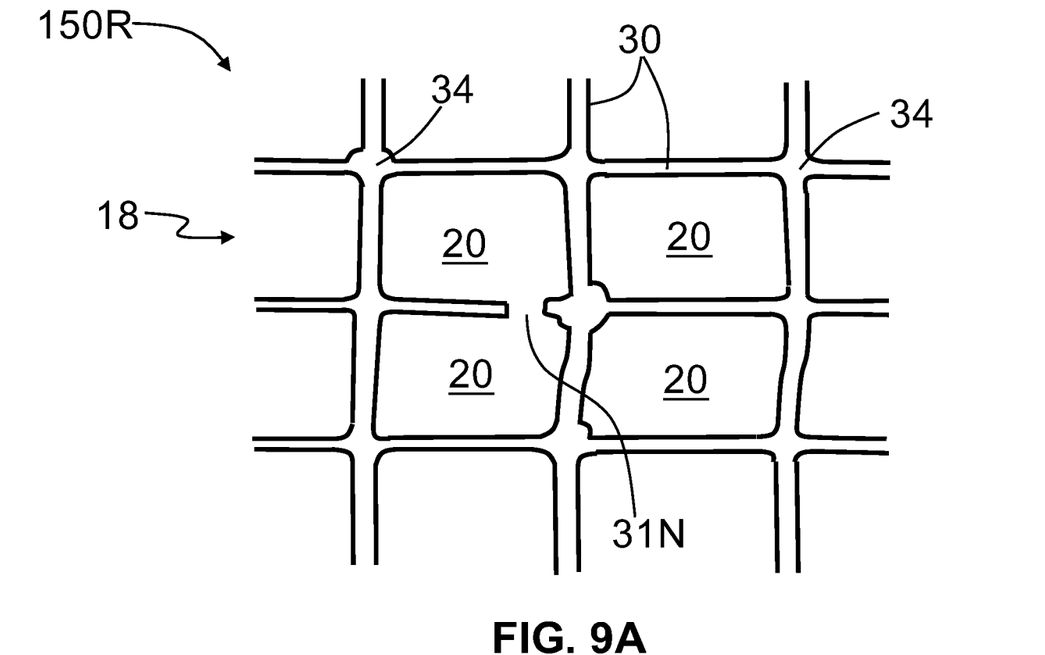
FIG. 9A is a schematic black and white representation of a portion of a captured image of a web of an example ceramic article based on an actual gray-scale captured image as obtained using the image capture system of FIG. 4D employing a 1700 dpi flatbed scanner.

The first step of the alternative method comprises capturing an image 150R of ceramic ware 10. FIG. 9A is schematic representation of a portion of a captured image of a web 18 of an example cellular article 10 based on an actual captured image obtained using the image capture system 100 of FIG. 4D with a 1700 dpi flatbed scanner.

Figure 9B:
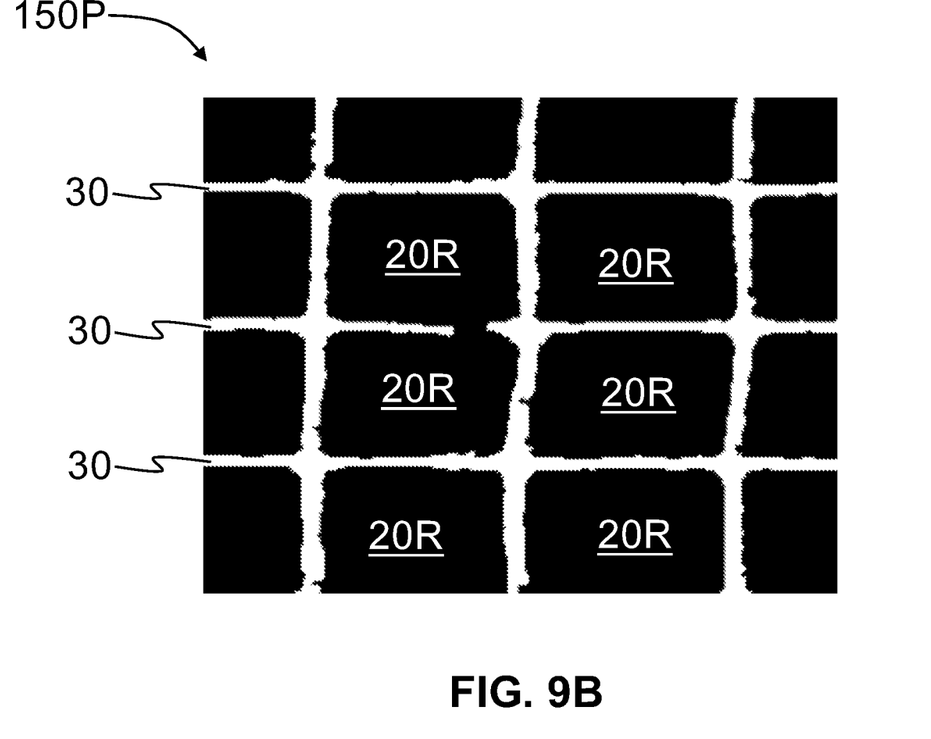
FIG. 9B is a schematic representation of a processed image as might be obtained by processing the captured image of FIG. 9A using a kernel of 297×297 pixels.

The next step involves applying a dynamic threshold process to the captured image 150 to obtain a processed image 150P. In an example, the dynamic threshold process is carried out by using a kernel having for example a size in the range from 150×150 pixels to 500×500 pixels. The resulting processed image shown in FIG. 9B used a kernel having 287×287 pixels. The processed image 150P can then be used to determine localized dynamic thresholds as explained below.

The processed image is then analyzed to identify cell regions 20R that represent the dark background intensities of cells 20 as compared to the bright intensities associated with walls 30. The area of each cell region 20R is determined and this information, along with the cell pitch $p_C$ (e.g., the center-to-center spacing of adjacent cells) is used as a filter to distinguish between conforming cell regions 20R and non-conforming cell regions that have a larger than expected area and cell pitch.

Figure 9C:
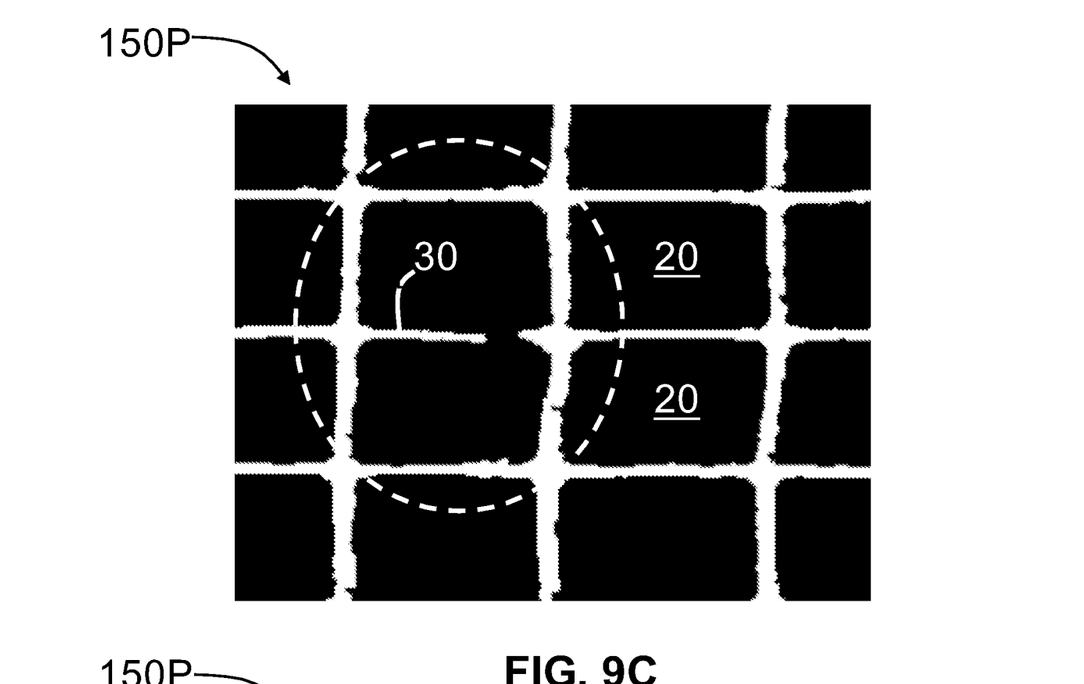
FIG. 9C shows a non-conforming cell in the processed image of FIG. 9B as indicated by the white dashed-line oval, wherein the non-conforming cell is the subject of scrutiny to characterize the wall defect therein.

The walls of non-conforming cells are then examined to determine if any of the walls had missing portions, i.e., non-knitter defects 31C. Such a non-conforming cell region 20R is shown in FIG. 9C in the white dashed oval. The estimated centroids C of cells 20 can be used to establish where walls 30 of the non-conforming cell region should reside.

Figure 9D:
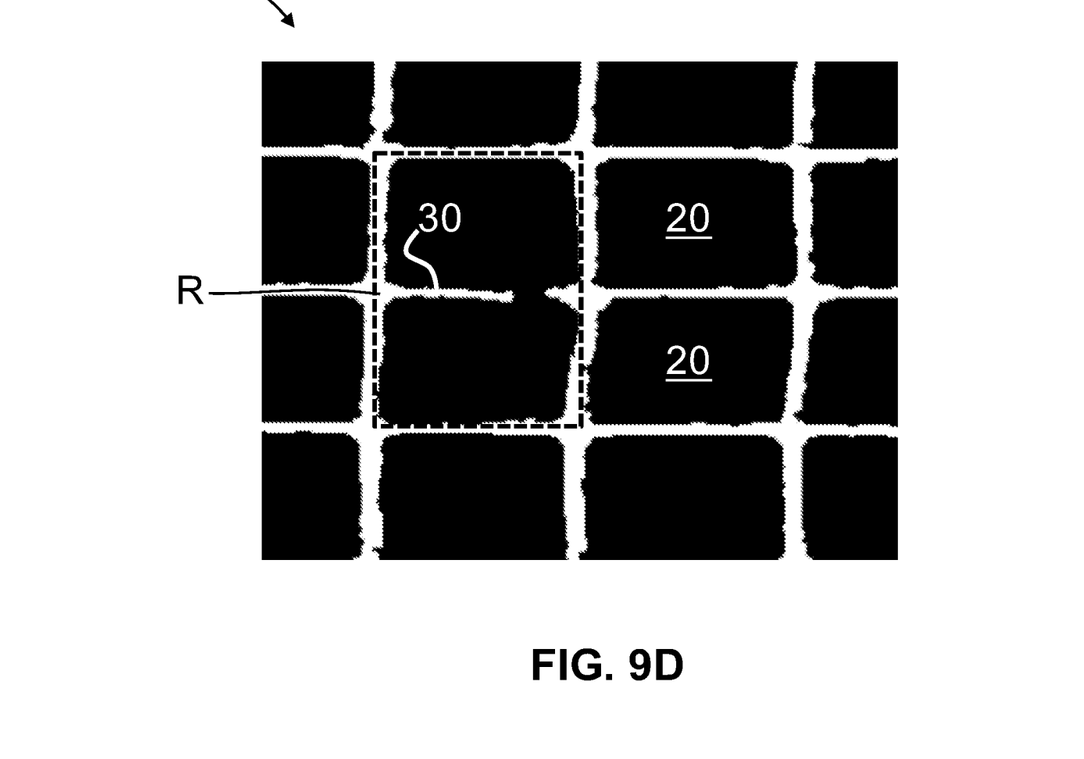
FIG. 9D is similar to FIG. 9C and shows a rectangle R superimposed on the processed image and corresponding in size to the non-conforming cell.

Once the particular wall 30 of the non-conforming cell region that has a missing portion is identified, the non-conforming cell is outlined with a rectangle R, as shown in FIG. 9D.

Figure 9E:
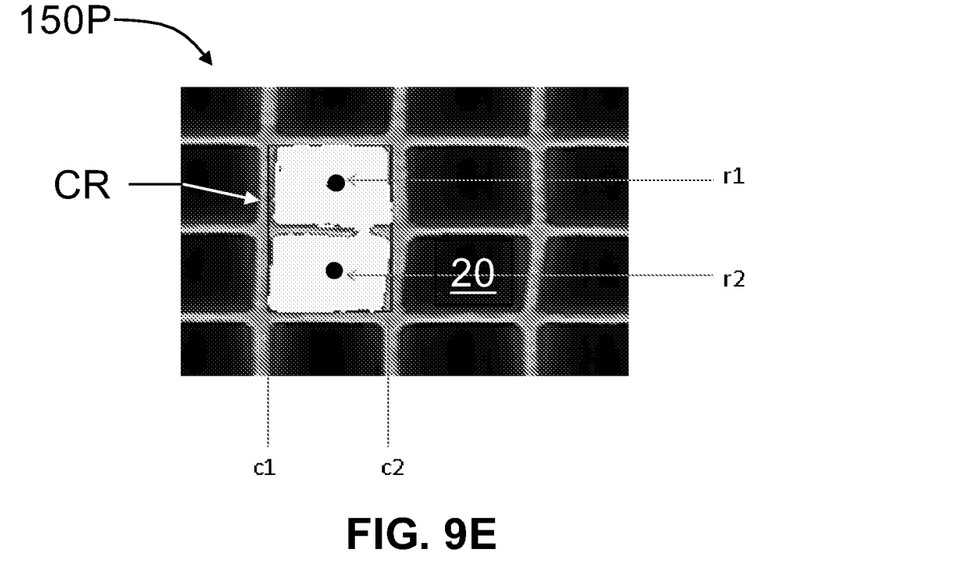
FIG. 9E shows how the centroid information of the cells and the rectangle defined in FIG. 9D are used to define a clipped region.

With reference now to FIG. 9E, the centroid information of the cells and the rectangle R defined in FIG. 9D are used to define a clipped region CR, wherein r1=centroid y location of target cell, r2=centroid y location of neighbor bottom cell, while c1 and c2 are x locations of rectangle R.

Figure 9F:
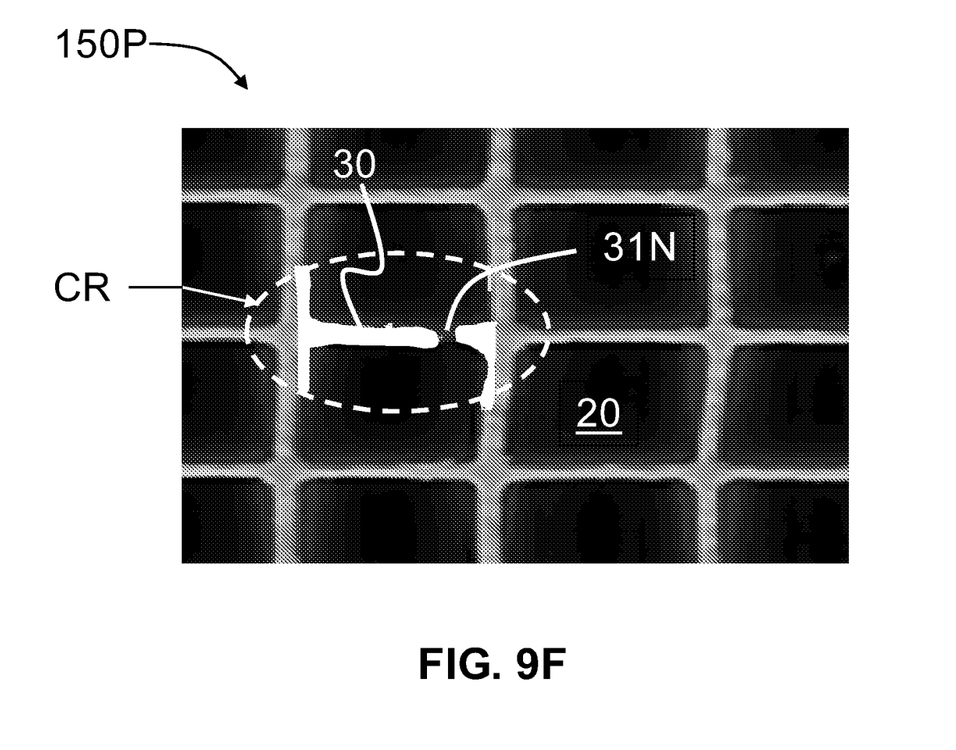
FIG. 9F shows the transformation of the clipped region to reproduce the web structure to reveal non-knitter defect in a central horizontal wall of the non-conforming cell.

With reference to FIG. 9F, the clipped region is transformed by defining a background portion of the cells 20 on either side of the isolated wall 30 and then filling in the remaining area to define the wall portions, which in the example shown reveal the non-knitter defect 31N.

Using this process, four main outcomes are possible. The first outcome is that an entire wall 30 of the non-conforming cell 20R is missing so that the non-conforming cell is essentially a cell that is twice the size of a conforming cell. The second outcome is that only one portion of the wall 30 is found, meaning that part of one side of the web wall is found but the entire other side is missing all of the way to the web intersection 34. The third outcome is that two portions of the web wall 30 under scrutiny are found and represent respective sides of the wall that has a gap formed therein. The fourth outcome is that when defining the wall portions, multiple sections are found. In this case, in one example, it is assumed that the two largest sections represent respective sides of a broken wall 30.

In each of the above outcomes, the size of the missing wall portion can be determined if necessary. In one example, all the method needs to convey is whether the web defect is a non-knitter defect 31N and if it is larger than a certain minimum size.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. A method of inspecting a web of a cellular article, wherein the web is defined by walls each having a width and a length and that in turn define an array of cells, the method comprising:
   a) characterizing a web structure from a digital image of the web in terms of intensity values, comprising establishing an edge location for each of the walls of the web, and an edge intensity slope $S_E$ for each edge location; and
   b) searching for a wall intensity slope $S_W$ in one of the web walls of the characterized web structure to determine the location of a web defect, if present in the web, wherein the condition $\alpha \cdot |S_E| \leq |S_W|$ is satisfied, wherein $\alpha$ is in the range from 0.75 to 1.

2. The method according to claim 1, wherein the intensity values comprise a peak value $I_P$, and wherein the edge location is taken as $\frac{1}{2} \cdot I_P$.

3. The method according to claim 1, further comprising capturing the digital image.

4. The method according to claim 3, wherein capturing the digital image comprises scanning either a front end or a back end of the cellular article with a line scanner.

5. The method according to claim 3, further comprising processing the captured digital image using a smoothing kernel, and carrying out act b) on the processed captured digital image.

6. The method according to claim 1, further comprising c) identifying the web defect by:
   d) defining a region of interest for the wall in which to search for the web defect, wherein the region of interest is defined by rows and columns of intensity values, with the columns and rows oriented along the width and length of the wall, respectively;
   e) calculating, for the region of interest, the following four web structure parameters: i) for each column, a maximum intensity value to generate a row of maximum intensity values $Imax_n$, ii) a first derivative $d(Imax_n)$ of the maximum intensity values, iii) a maximum of the first derivative dMax, iv) a minimum of the first derivative dMin, and iv) a distance NP between the maximum and a minimum values dMax and dMin; and
   f) identifying any web defects using the four web structure parameters $Imax_n$, dMax, dMin and NP.

7. The method according to claim 6, further comprising determining a maximum number CBT of consecutive intensity values in the row of intensity values $\text{Imax}_n$ that are below a select intensity threshold.

8. The method according to claim 7, further comprising identifying the web defect as a non-knitter when the conditions CBT>0, and dMax>$\text{TH}_{Max}$ and dMin<$\text{TH}_{Min}$, and NP>$\text{TH}_{NP}$ are satisfied, wherein $\text{TH}_{Max}$ is in the range from 35 to 50, $\text{TH}_{Min}$ is in the range from −35 to −50, and $\text{TH}_{NP}$ is in the range from 1 to 3.

9. The method according to claim 7, further comprising identifying the web defect as a chip when the conditions CBT>0, and dMax>$\text{TH}_{Max}$ and dMin<$\text{TH}_{Min}$, and NP>$\text{TH}_{NP}$ are satisfied, wherein $\text{TH}_{Max}$ is in the range from 20 to 30 $\text{TH}_{Min}$, is in the range from −20 to −30, and $\text{TH}_{NP}$ is in the range from 1 to 3.

10. The method according claim 1, wherein the web defect in act b) is a curved or bent web wall.

11. A method of locating a defect in a web of an extruded cellular ceramic article, wherein the web is defined by walls each having a width and a length and that in turn define an array of cells comprising:
 a) processing a captured digital image using a dynamic threshold process to form a processed image;
 b) determining at least one characteristic that defines a conforming cell;
 c) identifying a non-conforming cell region in the processed image based on the at least one characteristic that defines a conforming cell; and
 d) examining the walls within the non-conforming cell region to locate the defect in one of the walls within the non-conforming cell region.

12. The method according to claim 11, wherein the at least one characteristic that defines the conforming cell comprises an average cell area and a cell pitch.

13. The method according to claim 12, wherein the non-conforming cell has an area that exceeds the average cell area due to a non-knitter that makes the non-conforming cell area about twice the average cell area.

14. The method according to claim 1, further comprising capturing the digital image.

15. The method according to claim 14, wherein capturing the digital image comprises scanning an end of the ceramic article with a line scanner.

16. The method according to claim 14, wherein capturing the digital image comprises supporting an end of the ceramic article on a flatbed scanner and capturing the digital image with the flatbed scanner.

17. The method according to claim 11, wherein the defect is a curved web wall or a bent web wall.

18. The method according to claim 11, wherein the defect is a non-knitter.

19. The method according to claim 11, comprising determining a location of the defect within the web.

20. The method according to claim 11, comprising determining a size of the defect within the web.

* * * * *

UNITED STATES PATENT AND TRADEMARK OFFICE
CERTIFICATE OF CORRECTION

PATENT NO. : 10,769,772 B2
APPLICATION NO. : 15/575087
DATED : September 8, 2020
INVENTOR(S) : Russell Wayne Madara It is certified that error appears in the above-identified patent and that said Letters Patent is hereby corrected as shown below:

On the Title Page

Column 2, item (57) abstract, Line 6, delete "SE" and insert -- $S_E$ --, therefor.

Column 2, item (57) abstract, Line 7, delete "SW" and insert -- $S_W$ --, therefor.

In the Claims

In Column 11, Line 15, Claim 9, delete "$TH_{Min}$," and insert -- $TH_{Min}$ --, therefor.

In Column 11, Line 17, Claim 10, after "according" insert -- to --.

In Column 12, Line 12, Claim 14, delete "1" and insert -- 11 --, therefor.

Signed and Sealed this
Third Day of September, 2024

Katherine Kelly Vidal
*Director of the United States Patent and Trademark Office*